(12) United States Patent
Salo et al.

(10) Patent No.: US 12,458,268 B2
(45) Date of Patent: Nov. 4, 2025

(54) BIO-SIGNAL DETECTION

(71) Applicant: Nokia Technologies Oy, Espoo (FI)

(72) Inventors: Antti Salo, Lohja (FI); Kim Blomqvist, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1126 days.

(21) Appl. No.: 16/761,669

(22) PCT Filed: Nov. 20, 2018

(86) PCT No.: PCT/EP2018/081975
§ 371 (c)(1),
(2) Date: May 5, 2020

(87) PCT Pub. No.: WO2019/101754
PCT Pub. Date: May 31, 2019

(65) Prior Publication Data
US 2021/0177334 A1    Jun. 17, 2021

(30) Foreign Application Priority Data
Nov. 24, 2017  (EP) .................................... 17203660

(51) Int. Cl.
*A61B 5/277*     (2021.01)
*A61B 5/00*      (2006.01)
(Continued)

(52) U.S. Cl.
CPC ............ *A61B 5/28* (2021.01); *A61B 5/02108* (2013.01); *A61B 5/7225* (2013.01); *A61B 2562/0214* (2013.01)

(58) Field of Classification Search
None
See application file for complete search history.

(56) References Cited

U.S. PATENT DOCUMENTS

| 3,500,823 A | * | 3/1970 | Richardson | A61B 5/30 600/372 |
| 2002/0038092 A1 | | 3/2002 | Stanaland et al. | |

(Continued)

FOREIGN PATENT DOCUMENTS

| CN | 101583305 A | 11/2009 |
| CN | 103622688 A | 3/2014 |

(Continued)

OTHER PUBLICATIONS

Abdulhussain E. Mahdi et al., New displacement current sensor for contactless detection of bio-activity related signals, Sensors and Actuators A: Physical, vol. 222, 2015, pp. 176-183, https://doi.org/10.1016/j.sna.2014.11.019., viewed on Oct. 28, 2022 (Year: 2015).*

(Continued)

*Primary Examiner* — James M Kish
*Assistant Examiner* — James Moss
(74) *Attorney, Agent, or Firm* — International IP Law Group, PLLC

(57) ABSTRACT

An apparatus comprising: a displacement current sensor configured to measure for a subject one or more sensed electrical signals; and circuitry configured to process the one or more sensed electrical signals to obtain an electrocardiogram signal and a variable impedance signal caused by an arterial pulse wave.

6 Claims, 3 Drawing Sheets

(51) Int. Cl.
  *A61B 5/021*     (2006.01)
  *A61B 5/28*      (2021.01)

(56) References Cited

U.S. PATENT DOCUMENTS

| | | | |
|---|---|---|---|
| 2006/0058694 A1 | 3/2006 | Clark et al. | |
| 2007/0142735 A1 | 6/2007 | Shin et al. | |
| 2013/0131530 A1 | 5/2013 | Brockway et al. | |
| 2014/0213882 A1* | 7/2014 | Chung | A61B 5/0006 600/372 |
| 2015/0157269 A1 | 6/2015 | Lisogurski et al. | |
| 2016/0206245 A1 | 7/2016 | Morland et al. | |
| 2016/0220122 A1 | 8/2016 | Luna et al. | |
| 2020/0305740 A1* | 10/2020 | Quan | A61B 5/02108 |

FOREIGN PATENT DOCUMENTS

| | | |
|---|---|---|
| CN | 104545854 A | 4/2015 |
| DE | 10249863 A1 | 5/2004 |
| EP | 3459449 A1 | 3/2019 |
| EP | 3461401 A1 | 4/2019 |
| EP | 3488767 A1 | 5/2019 |
| WO | 2005110051 A2 | 11/2005 |
| WO | 2015/018675 A1 | 2/2015 |
| WO | 2017/172978 A1 | 10/2017 |
| WO | 2019/086182 A1 | 5/2019 |

OTHER PUBLICATIONS

A. Lopez et al., "Capacitive electrocardiograma bioelectric electrodes", IEEE Transactions on Biomedical Engineering, vol. 16, pp. 299-300, 1969. https://ieeexplore.ieee.org/document/4502613, viewed on Oct. 28, 2022 (Year: 1969).*

C. J. Harland et al 2002 Meas. Sci. Technol. 13 163, https://iopscience.iop.org/article/10.1088/0957-0233/13/2/304/meta, viewed on Oct. 28, 2022 (Year: 2002).*

R. J. Prance et al 2007 J. Phys.: Conf. Ser. 76 012025, https://iopscience.iop.org/article/10.1088/1742-6596/76/1/012025/meta, viewed on Oct. 28, 2022 (Year: 2007).*

C. J. Harland et al 2003 Meas. Sci. Technol. 14 923, https://iopscience.iop.org/article/10.1088/0957-0233/14/7/305, viewed on Oct. 28, 2022 (Year: 2003).*

Alametsa et al., "Ballistocardiogaphic Studies with Acceleration and Electromechanical Film Sensors", Medical Engineering & Physics, vol. 31, 2009, pp. 1154-1165.

Shin et al., "Non-constrained Monitoring of Systolic Blood Pressure on a Weighing Scale", Physiological Measurement, vol. 30, 2009, pp. 679-693.

Pallas-Areny et al., "On bio-activity related signals from contactlesselectrode measurements", Sensors and Actuators A: Physical, vol. 238, 2016, pp. 249-250.

Inan et al., "Ballistocardiography and Seismocardiography: A Review of Recent Advances", IEEE Journal of Biomedical and Health Informatics, vol. 19, No. 4, Jul. 2015, pp. 1414-1427.

Aleksandrowicz et al., "Wireless and Non-contact ECG Measurement System—the "Aachen SmartChair"", Acta Polytechnica, vol. 47, No. 4, May 2007, pp. 68-71.

Lim et al., "ECG Measurement on a Chair Without Conductive Contact", IEEE Transactions on Biomedical Engineering, vol. 53, No. 5, May 2006, pp. 956-959.

Lim et al., "ECG Recording on a Bed During Sleep Without Direct Skin-Contact", IEEE Transactions on Biomedical Engineering, vol. 54, No. 4, Apr. 2007, pp. 718-725.

Prance et al., "Biological and medical applicationsof a new electric field sensor", Proc. ESA Annual Meeting on Electrostatics, Paper N2, 2008, pp. 1-4.

Prance et al., "Non-Contact voltage and electric field measurement using the electric potential sensor", Centre for Physical Electronics and Quantum Technology, 2007, 32 pages.

Phillips et al., "Evaluation of electrical and optical plethysmography sensors for noninvasive monitoring of hemoglobin concentration", Sensors, vol. 12, 2012, pp. 1816-1826.

Casanella et al. "On time interval measurements using BCG", 34th Annual International Conference of the IEEE EMBS, Aug. 28, Sep. 1, 2012, pp. 5034-5037.

Gomez-Clapers et al., "Direct Pulse Transit Time measurement from an electronic weighing scale", Computing in Cardiology, vol. 43, 2016, pp. 773-776.

Fukushima et al., "Estimating heart rate using wrist-type photoplethysmography and acceleration sensor while running", 34th Annual International Conference of the IEEE EMBS, Aug. 28-Sep. 1, 2012, pp. 2901-2904.

Extended European Search Report received for corresponding European Patent Application No. 17203660.0, dated Apr. 19, 2018, 8 pages.

Mahdi et al., "New displacement current sensor for contactless detection of bio-activity related signals", Sensors and Actuators A: Physical, vol. 222, 2015, pp. 176-183.

Portelli et al., "Design and Development of Non-Contact Bio-Potential Electrodes for Pervasive Health Monitoring Applications", Biosensors, vol. 7, 2017, pp. 1-14.

International Search Report and Written Opinion received for corresponding Patent Cooperation Treaty Application No. PCT/EP2018/081975, dated Mar. 8, 2019, 13 pages.

Office action received for corresponding European Patent Application No. 17203660.0, dated Jan. 31, 2020, 4 pages.

Office Action received for corresponding Chinese Patent Application No. 201880075606.8, dated Mar. 31, 2023, 6 pages.

* cited by examiner

BIO-SIGNAL DETECTION

RELATED APPLICATION

This application claims priority to PCT Application No. PCT/EP2018/081975, filed on Nov. 20, 2018, which claims priority to European Application No. 17203660.0, filed on Nov. 24, 2017, each of which is incorporated herein by reference in its entirety.

TECHNOLOGICAL FIELD

Embodiments of the present invention relate to bio-signal detection. In particular, they relate to detecting bio-signals simultaneously.

BACKGROUND

Bio-signals are signals that provide information about the functioning of a subject's body. There are a very large number of bio-signals.

Bio-signals that relate to the heart and circulation include, for example, systolic blood pressure, diastolic blood pressure, heart rate, electrocardiogram, pulse wave velocity, phonocardiogram, ballistocardiogram, echocardiogram etc.

It is desirable to obtain multiple different bio-signal measurements simultaneously.

BRIEF SUMMARY

According to various, but not necessarily all, embodiments of the invention there is provided an apparatus comprising:
  a displacement current sensor configured to measure for a subject one or more sensed electrical signals; and
  circuitry configured to process the one or more sensed electrical signals to obtain an electrocardiogram signal and a variable impedance signal caused by an arterial pulse wave.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which FIG. 1 illustrates an example of an apparatus for processing one or more sensed electrical signals to obtain an electrocardiogram signal and a variable impedance signal caused by an arterial pulse wave;

DETAILED DESCRIPTION

Figure 1:
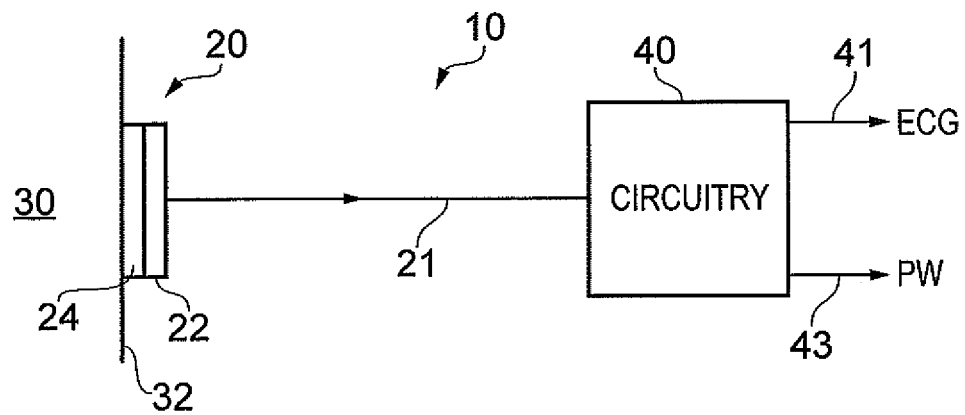

FIG. 1 illustrates an example of an apparatus 10 for processing one or more sensed electrical signals 21 to obtain an electrocardiogram signal 41 and a variable impedance signal 43 caused by an arterial pulse wave.

The electrocardiogram signal 41 is a signal that depends upon the electrical polarization and depolarization of the heart muscles. It is indicative of heart function.

The variable impedance signal 43 is a signal that depends upon both the generation of an arterial pulse wave and the transport of the arterial pulse wave, which is a pressure wave, through the arterial system. It is indicative of heart output and arterial function.

The apparatus 10 may therefore be, or be a part of, a circulation monitoring system or a health monitoring system that uses the electrocardiogram signal 41 and the variable impedance signal 43 to assess heart function/output and arterial function. This may find application for patient monitoring, for personal health monitoring, for fitness assessment, for exercise effectiveness monitoring etc.

Figure 2:
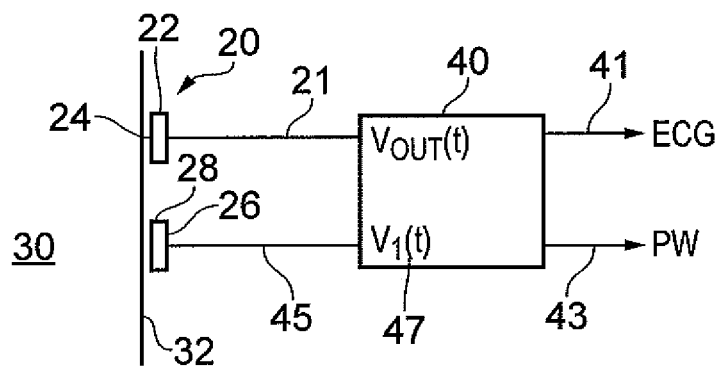
FIGS. 2 and 3 illustrates examples of an apparatus for processing one or more sensed electrical signals to obtain an electrocardiogram signal and a variable impedance signal caused by an arterial pulse wave, where the variable impedance signal is measured as a modulation of an applied electrical reference signal.
Figure 3:
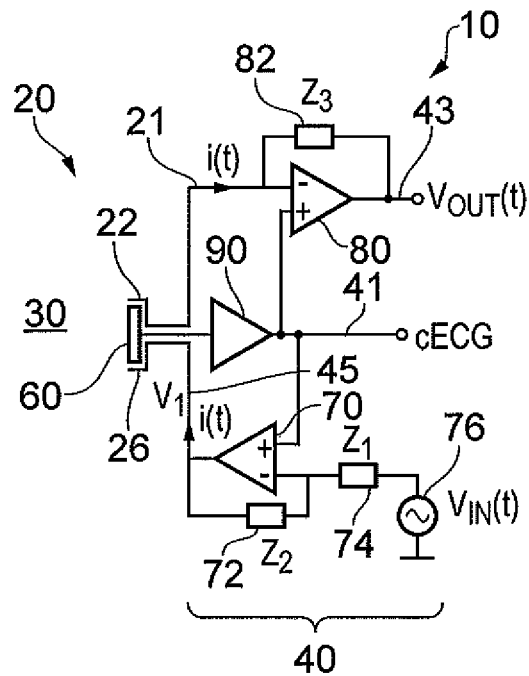
Figure 6:
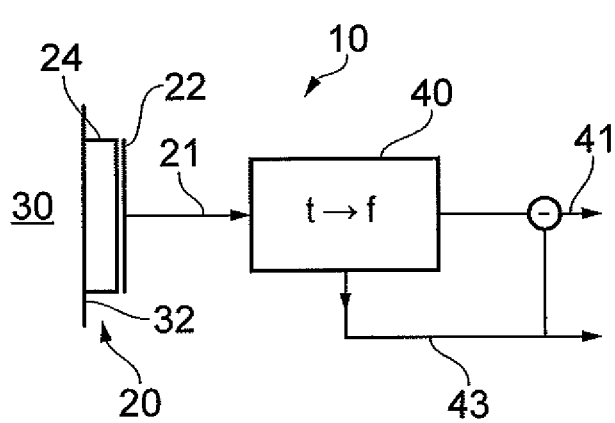
FIG. 6 illustrates an example of an apparatus for processing one or more sensed electrical signals to obtain an electrocardiogram signal and a variable impedance signal caused by an arterial pulse wave, where the variable impedance signal is measured as a modulation of an internal naturally-generated electrical.

The apparatus 10 comprises at least a displacement current sensor 20 and circuitry 40 operatively connected to the displacement current sensor 20. The connection may, for example, be a direct galvanic connection via a lead, as illustrated in FIGS. 2, 3, 6.

The displacement current sensor 20 is configured to measure for a subject 30 one or more sensed electrical signals 21. The sensor 20 detects the one or more sensed electrical signals 21. The sensor 20 may or may not further process the detected electrical signal to produce the one or more sensed electrical signals 21. Measurement does not therefore imply that the one or more sensed electrical signals is quantised, although it may be.

The total current density (defined by curl H) has a galvanic component J and a displacement component dD/dt, where D=εE. The displacement current sensor 20 measures D and its variation over time, dD/dt.

The displacement current sensor 20 comprises at least one electrode 22 adjacent the skin 32 of the subject 30 and comprises electrical insulation 24 for insulating the at least one electrode 22 from the subject's skin 32. This prevents the displacement current sensor 20 from receiving the galvanic component J of the total current density.

The circuitry 40 is configured to process the one or more sensed electrical signals 21 to obtain an electrocardiogram signal 41 and a variable impedance signal 43 caused by an arterial pulse wave.

The circuitry 40 may be any suitable circuitry. It may be an arrangement of discrete components, and/or may comprise programmable gate arrays, and/or may comprise programmed processors, for example.

In some but not necessarily all examples, the circuitry 40 is configured to measure the variable impedance signal 43 caused by an arterial pulse wave as a modulation of a reference signal. In the examples illustrated in FIGS. 2 and 3, the reference signal is an external signal 45 applied to the subject 30. In the example illustrated in FIG. 6, the reference signal is an internal naturally-generated signal, generated by the subject's heartbeat.

In the examples of FIGS. 2 and 3, the circuitry 40 is configured to process the one or more sensed electrical signals 21 to obtain an electrocardiogram signal 41 and a variable impedance signal 43 caused by an arterial pulse wave. The circuitry 40 measures the variable impedance signal 43 caused by an arterial pulse wave as a modulation of the electrical reference signal 45 provided to the subject 30 via the first electrode 26 by the circuitry 40.

The circuitry 40 is configured to apply a time variable voltage V1, as the reference signal 45, to a first electrode 26, for example via a first operational amplifier 70, and measure a time variable signal 43 (voltage $V_{out}$), for example at an output of a second operational amplifier 80.

In these examples, the additional first electrode 26 is adjacent the subject's skin 32 and comprises electrical insulation 24 for insulating the first electrode 26 from the subject's skin 32.

The electrical reference signal 45 has one or more high frequency components, for example, greater than 1 kHz. In some examples, the electrical reference signal 45 may have a significant component greater than 100 kHz, for example, in the range 100-500 kHz, or in some embodiments may lie entirely within the range 100-500 kHz.

The electrical reference signal 45 may, for example, be a pure tone (single frequency).

The displacement current sensor 20 is located at a location defined by a desired ECG vector. The first electrode 26 may be adjacent the electrode 22 in the displacement current sensor 20.

In the example of FIG. 3, the displacement current sensor 20 comprises an ECG electrode 60 for measuring an ECG signal 41, a first electrode 26 for injection of a current (reference signal 45), and a distinct second electrode 22 for providing the variable impedance signal 43 caused by an arterial pulse wave.

The circuitry 40 is configured to apply a time variable voltage V1 to a first electrode 26 via a first operational amplifier 70, and provide a time variable signal 43 (voltage $V_{out}$) at an output of a second operational amplifier 80.

Figure 4A:
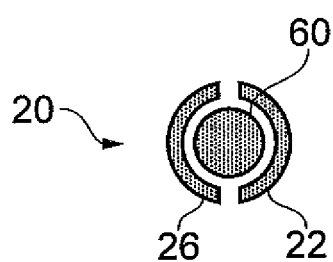
FIGS. 4A and 4B illustrate example of configurations of guard electrodes for an ECG electrode.
Figure 4B:
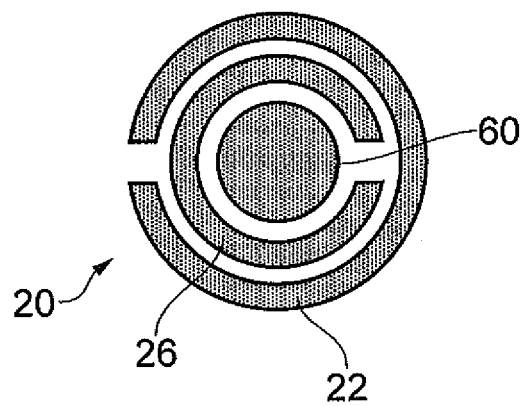

As illustrated in more detail in FIGS. 4A and 4B, the first electrode 26 and the second electrode 22 are guard electrodes for the ECG electrode 60. The ECG electrode is centrally located. In these examples it is circular but this is not necessarily essential. The first electrode 26 and the second electrode 22 are separated from the ECG electrode 60 and from each other, in these example, low relative permittivity gaps are used for separation.

In the example of FIG. 4A, the first electrode 26 and the second electrode 22 are arranged to both lie on a common shape that encloses the ECG electrode 60, in this case a circle circumscribing but separated from the ECG electrode 60. In this example, the displacement current sensor 20 has 180° rotational symmetry. In this example, the first electrode 26 and the second electrode 22 have the same contact area.

In the example of FIG. 4B, the first electrode 26 and the second electrode 22 are arranged to both lie on differently sized shapes that enclose the ECG electrode 60, in this case circles of different radius circumscribing but separated from the ECG electrode 60 and each other. In this example, the displacement current sensor 20 has 360° rotational symmetry. In some examples, the first electrode 26 and the second electrode 22 have the same contact area.

Returning to FIG. 3, the ECG signal 41 received at the ECG electrode 60 is applied, via op-amp 90, as a virtual earth at a +ve terminal of a first op-amp 70 and is applied as a virtual earth at a +ve terminal of the second op-amp 80. A voltage divider may be used in some examples (not illustrated). For example, impedances $Z_A$ and $Z_B$ may be connected in series between the output of the op-amp 90 and ground, and an intermediate node between impedances $Z_A$ and $Z_B$ may be connected to +ve terminal of the first op-amp 70 and +ve terminal of the second op-amp 80.

The first op-amp 70 generates at its output a current and a voltage V1 at the first guard electrode 26. The first op-amp is arranged for closed loop negative feedback via an impedance 72 connected between its output and its −ve terminal. The impedance 72 has a value $Z_2$. The first op-amp 70 is arranged to receive an input at its −ve terminal, via an impedance 74, from a variable voltage source 76. The impedance 74 has a value $Z_1$. The ECG signal 41 received at ECG electrode 60 is applied, after amplification by op-amp 90, as a virtual earth at a +ve terminal of the first op-amp 70.

The second op-amp 80 receives at a −ve terminal a voltage from the second guard electrode 22. The second op-amp 80 is arranged for closed loop negative feedback via an impedance 82 connected between its output and its −ve terminal. The impedance 82 has a value $Z_3$. The ECG signal 41 received at ECG electrode 60 is applied, after amplification by op-amp 90, as a virtual earth at a +ve terminal of the second op-amp 80. The second op-amp 80 generates at its output a voltage $V_{out}$ which is the variable impedance signal 43. In some examples, but not this example, an impedance $Z_4$ may be connected between the second guard electrode 22 and the −ve terminal of the second op-amp 80.

The current at the −ve terminal of the second op-amp 80 depends on the voltage (V1) at the first electrode 26 (relative to virtual earth) and an unknown impedance Z associated with the current path through the subject's body. The impedance Z is comprised of a steady state value and a variable value that may be assumed to arise substantially from the arterial pulse wave. The output of the op-amp 80 is therefore a variable impedance signal 43 caused by an arterial pulse wave.

The current at the −ve terminal of the first op-amp 70 is $V_{in}/Z_1$, where $V_{in}$ is the variable voltage (relative to virtual earth) applied to a −ve input of the first op-amp 70 via impedance $Z_1$. The first op-amp is arranged for closed loop, negative feedback. The output of the first op-amp 70 is therefore $V_1 = V_{in}*(1+Z_2/Z_1)$. The current at the −ve terminal of the second op-amp 70 is $V_1/Z$ where $V_1$ is the variable voltage (relative to virtual earth) applied to a −ve input of the second op-amp 80 via the body impedance Z. The second op-amp 80 is arranged for closed loop, negative feedback. The output of the second op-amp 80 is therefore $V_{out} = Z_3*V_1/Z = V_{in}*(Z_3/Z)*(1+Z_2/Z_1)$.

It is possible to separate the part of $V_{out}$ that arises as a consequence of variation in Z from the the part of $V_{out}$ that arises as a consequence of variation in $V_{in}$.

This may, for example, be achieved by subtracting $V_{in}$ from $V_{out}$ in the frequency domain using a demodulator.

If $Z_1$, $Z_2$, $Z_3$ are resistors, then at the higher frequencies of $V_{in}$ the steady state impedance of the body may be considered to be primarily resistive. The changing impedance arising from the distance between an arterial wall and the skin surface decreasing with a passing arterial pulse wave will be primarily reactive (increasing capacitance). The changing impedance arising from the increasing blood volume in an artery with a passing arterial pulse wave will be primarily resistive (decreasing resistance).

Changes in the imaginary (reactive) part of the variable impedance signal 43 may therefore be attributed to variation in capacitance arising from the arterial pulse wave.

Changes in the real (resistive) part of the variable impedance signal 43 may therefore be attributed to variation in resistance arising from the arterial pulse wave.

The parameter indicative of the elasticity of the artery may therefore be determined from the imaginary (reactive) part of the variable impedance signal 43 and the real (resistive) part of the variable impedance signal 43.

Figure 5:
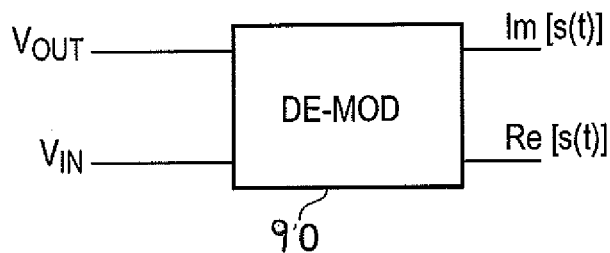
FIG. 5 illustrates an example of a demodulation circuit.

FIG. 5 illustrates an example of a demodulation circuit 90. The demodulation circuit 90 processes the input time-variable voltage $V_{in}$ and the output time-variable voltage $V_{out}$ to obtain Imaginary and Real components of the variable impedance signal 43.

The demodulation circuit 90 may be configured to calculate how the complex transfer function between the input time-variable voltage $V_{in}$ and the output time-variable voltage $V_{out}$ varies over time. The complex transfer function is related to the variable impedance Z via constant impedances and may be used as the variable impedance signal 43 or may be further processed to obtain the variable impedance signal 43.

In the examples of FIG. 6, the circuitry 40 is configured to process the one or more sensed electrical signals 21 to obtain an electrocardiogram signal 41 and a variable impedance signal 43 caused by an arterial pulse wave. The circuitry 40 measures the variable impedance signal 43 caused by an arterial pulse wave as a modulation of the electrical reference signal (the ECG signal 41) which is an internal naturally-generated signal, generated by the subject's heartbeat.

The displacement current sensor 20 comprises a displacement current electrode 22 having a capacitance that varies with varying arterial blood volume under the displacement current sensor 20 when in situ. The displacement current electrode 22 may be a modified ECG electrode 60.

The displacement current electrode 22 operates as one side of a capacitor, the other side being provided by the body of the subject. The displacement current is dependent upon relative permittivity between the displacement current electrode 22 and the skin 32 and the physical separation (distance d) between the displacement current electrode 22 and the skin 32.

The displacement current sensor 20 is adapted to allow an arterial pulse wave to modulate the relative permittivity between the displacement current electrode 22 and the skin 32 and/or modulate the physical separation (distance d) between the displacement current electrode 22 and the skin 32.

A material that polarizes with applied force, a piezoelectric material, may, for example, be used as a dielectric 24 between the displacement current electrode 22 and subject's skin 32 to vary the relative permittivity between the displacement current electrode 22 and the skin 32 in response to an arterial pulse wave.

A material that resiliently deforms with applied force, an elastic material, may, for example, be used as a dielectric 24 between the displacement current electrode 22 and subject's skin 32 to vary physical separation (distance d) between the displacement current electrode 22 and the skin 32 in response to an arterial pulse wave.

The circuitry 40 is, in this example, configured to process the one or more sensed electrical signals 21 to obtain an electrocardiogram signal 41 and a variable impedance signal 43 caused by an arterial pulse wave by measuring the variable impedance signal 43 caused by an arterial pulse wave and removing the variable impedance signal 43, in the frequency domain or the time domain, from the one or more sensed electrical signals 21 to obtain an electrocardiogram signal 41.

The variable impedance signal 43 caused by an arterial pulse wave may be time separated from the electrocardiogram signal 41 because, for example, the transport time for an arterial pulse wave is greater than the transport time for the ECG signal.

Also, if one samples over a period of time that captures a single PQRST profile of an ECG signal and a single arterial pulse wave, then higher frequency components are associated with the QRS morphology of the ECH signal.

Other techniques such as, for example, adaptive filtering may be used to remove the variable impedance signal 43 from the measured signal to obtain a 'clean' ECG signal. The variable impedance signal 43 may be used as an external reference signal for an adaptive filter for filtering the sensed signal 21.

Figure 7:
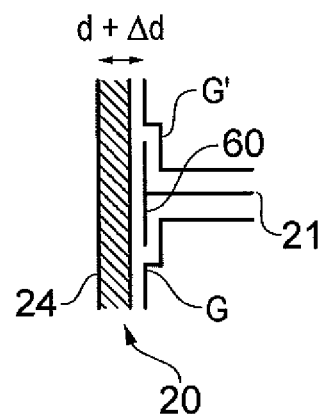
FIG. 7 illustrates an example of a displacement current sensor comprising an ECG electrode with guard electrodes, suitable for use in the apparatus illustrated in FIG. 6.

As illustrated in FIG. 7, the displacement current sensor 20 the ECG electrode 60, may use guard electrodes G, G'. The guard electrodes may, for example, be connected as the first and second guard electrodes 22, 26 of FIG. 3, with or without the application of the input time-variable voltage 76.

Figure 8:
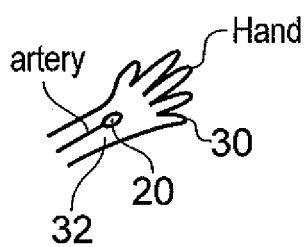
FIG. 8 illustrates how a displacement current sensor may be placed on a body of a subject.

FIG. 8 illustrates that the displacement current sensor 20 may be placed on a body of a subject on the skin 32 of the subject 30, at a location that overlies an artery of the subject 30. In some examples, the displacement current sensor 20 is placed over the brachial artery or a sub-branch of the brachial artery such as the radial artery.

In some examples, multiple displacement current sensors 20 are used to provide differential measurements across the subject's body. For example, displacement current sensor 20 may be placed on a left side or left limb of the body (e.g. left wrist) and a different displacement current sensor 20 may be placed on a right side or right limb of the body (e.g. right wrist). Measurements may be made for the same heartbeat at both sensors 20 and compared.

Figures 9A, 9B:
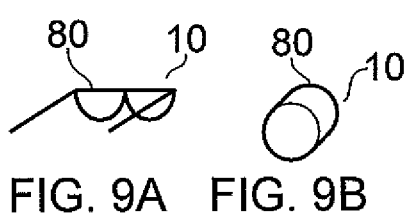
FIGS. 9A, 9B, 9C illustrate that the apparatus may be configured as part of an article worn by the subject.
Figure 9C:

FIGS. 9A, 9B, 9C illustrate that the apparatus 10 may be configured as part of an article 80 worn by the subject 30. In FIG. 9A, the article 80 is a spectacle frame. In FIG. 9B, the article 80 is a wrist band. In FIG. 9C, the article 80 is clothing, a shoe.

Figure 10:
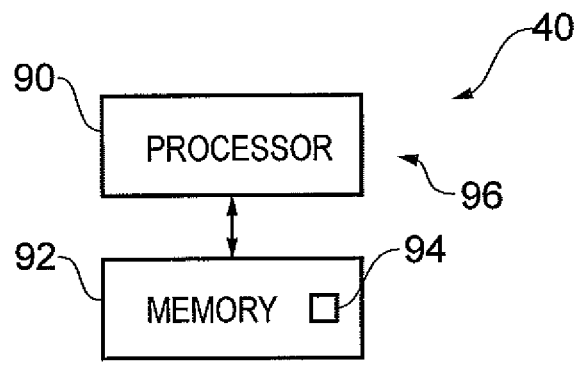
FIG. 10 illustrates an example of circuitry.

As illustrated in FIG. 10 the controller 96 may be implemented using instructions that enable hardware functionality, for example, by using executable instructions of a computer program 94 in a general-purpose or special-purpose processor 90 that may be stored on a computer readable storage medium (disk, memory etc) to be executed by such a processor 90.

The processor 90 is configured to read from and write to the memory 92. The processor 90 may also comprise an output interface via which data and/or commands are output by the processor 90 and an input interface via which data and/or commands are input to the processor 90.

The memory 92 stores a computer program 94 comprising computer program instructions (computer program code) that controls the operation of the apparatus 10 when loaded into the processor 90. The computer program instructions, of the computer program 94, provide the logic and routines that enables the apparatus to perform the methods illustrated in FIG. 11. The processor 90 by reading the memory 92 is able to load and execute the computer program 94.

The apparatus 10 therefore comprises:
at least one processor 90; and
at least one memory 92 including computer program code
the at least one memory 92 and the computer program code configured to, with the at least one processor 90, cause the apparatus 10 at least to perform:
using a displacement current sensor configured to sense for a subject one or more electrical signals; and
processing the one or more sensed electrical signals to obtain an electrocardiogram signal and a variable impedance signal caused by an arterial pulse wave.

The computer program 94 may arrive at the apparatus 10 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 94. The delivery mechanism may be a signal configured to reliably transfer the computer program 94. The apparatus 10 may propagate or transmit the computer program 94 as a computer data signal.

Although the memory 92 is illustrated as a single component/circuitry it may be implemented as one or more separate components/circuitry some or all of which may be integrated/removable and/or may provide permanent/semi-permanent/dynamic/cached storage.

Although the processor 90 is illustrated as a single component/circuitry it may be implemented as one or more separate components/circuitry some or all of which may be integrated/removable. The processor 90 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 11:
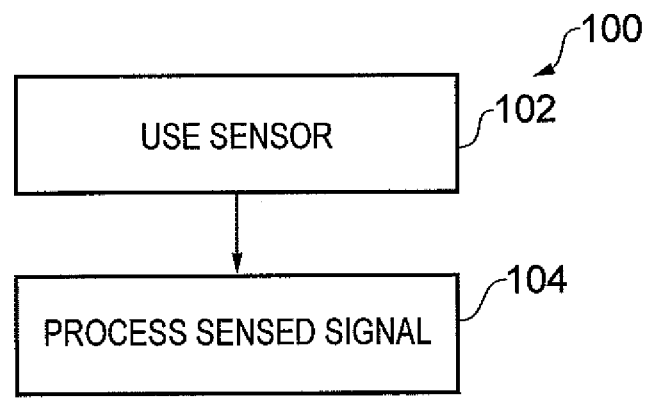
FIG. 11 illustrates an example of a method.

FIG. 11 illustrates an example of a method 100 comprising:
at block 102, using a displacement current sensor 20 configured to sense for a subject 30 one or more electrical signals 21; and
at block 104, processing the one or more sensed electrical signals 21 to obtain an electrocardiogram signal 41 and a variable impedance signal 43 caused by an arterial pulse wave.

Implementation of the circuitry 40 may be as a controller 96, for example. The controller 96 may be implemented in hardware alone, have certain aspects in software including firmware alone or can be a combination of hardware and software (including firmware).

The blocks illustrated in FIG. 11 may represent steps in a method and/or sections of code in the computer program 94. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The apparatus 10 may be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a displacement current sensor configured to measure for a subject one or more sensed electrical signals, wherein the displacement current sensor comprises at least one electrode; and
circuitry configured to process the one or more sensed electrical signals from the displacement current sensor to obtain an electrocardiogram (ECG) signal and a variable impedance signal caused by an arterial pulse wave, wherein the circuitry configured to process the one or more sensed electrical signals to obtain the electrocardiogram signal and the variable impedance signal caused by the arterial pulse wave is configured to measure the variable impedance signal caused by the arterial pulse wave as a modulation of the ECG signal.

2. An apparatus as claimed in claim 1, wherein the circuitry configured to process the one or more sensed electrical signals to obtain an electrocardiogram signal and variable impedance signal caused by an arterial pulse wave is configured to:
obtain an Imaginary part of a signal dependent upon an impedance between first and second guard electrodes of an ECG electrode.

3. An apparatus as claimed in claim 1, wherein the displacement current sensor comprises a displacement current electrode having a capacitance that varies with varying arterial blood volume under the displacement current sensor when in situ;
wherein the circuitry configured to process the one or more sensed electrical signals to obtain the electrocardiogram signal and the variable impedance signal caused by the arterial pulse wave, is configured to:
process the signal at the displacement current electrode to measure the variable impedance signal caused by the arterial pulse wave.

4. An apparatus as claimed in claim 3, wherein the displacement current electrode comprises resiliently flexible dielectric.

5. An apparatus as claimed in claim 3, wherein
the circuitry configured to process the one or more sensed electrical signals to obtain the electrocardiogram signal and the variable impedance signal caused by the arterial pulse wave, is configured to:
in the frequency domain, remove the variable impedance signal from the one or more sensed electrical signals to obtain the electrocardiogram signal.

6. An apparatus as claimed in claim 1, wherein the circuitry is configured to use the variable impedance signal dependent upon an impedance between first and second guard electrodes of an ECG electrode as an external reference signal for an adaptive filter for filtering the sensed signal.

* * * * *